Feb. 16, 1971

R. A. KULICK

CLOCK MECHANISM 3,563,025

Filed Aug. 14, 1969

3 Sheets-Sheet 1

Inventor
ROBERT A. KULICK

BY

Robert L. Kahn
ATTYS

Feb. 16, 1971 R. A. KULICK 3,563,025

CLOCK MECHANISM

Filed Aug. 14, 1969 3 Sheets-Sheet 2

Inventor
ROBERT A. KULICK

BY

Robert L. Kahn
ATTY.

Feb. 16, 1971 R. A. KULICK 3,563,025

CLOCK MECHANISM

Filed Aug. 14, 1969 3 Sheets-Sheet 3

Inventor
ROBERT A. KULICK

BY

Robert L. Kahn
ATTY.

United States Patent Office 3,563,025

Patented Feb. 16, 1971

3,563,025

CLOCK MECHANISM

Robert A. Kulick, Streamwood, Ill., assignor to DuKane Corporation, St. Charles, Ill., a corporation of Delaware Filed Aug. 14, 1969, Ser. No. 849,995

Int. Cl. G04c *9/00*

U.S. Cl. 58—35 3 Claims

ABSTRACT OF THE DISCLOSURE

The invention relates to a clock driven by a synchronous electric motor and adapted to be reset at periodic intervals from signals received from a master clock. The clock forming the subject matter of this invention is provided with means for inhibiting or preventing a reset signal from causing reset action to occur if the clock is on time. If reset is called for, then such action takes place over an appropriate time interval. The particular invention involved here relates to the mechanical structure between armature normally responsive to signal reset impulses and a generally conventional reset mechanism. This conventional reset mechanism has been modified to embody the reset inhibiting function. In addition, the cam arrangement provides for more accurate control.

This invention relates to a clock mechanism and more particularly to a clock powered by a synchronous electric motor and having means for reset in response to suitable signals from a master station. The invention is characterized by reset prevention when unnecessary because the clock is on time.

In my prior application S.N. 694,946 filed Jan. 2, 1968, I have disclosed and claimed such clock operation. The present invention is an improvement upon the clock disclosed in my prior application. The improvement disclosed herein effects some economies in engineering and tooling.

The details of the present invention can best be understood by reference to the drawings taken in conjunction with the description which follows.

Referring now to the drawings: FIG. 1 shows a side elevation of the clock embodying the present invention.

FIG. 1–A is an exploded perspective view of the parts of a stop disc assembly, forming part of the clock mechanism.

FIG. 1–B shows a side view of one side of a stop disc.

FIG. 1–C shows the other side of a stop disc.

FIG. 1–D is an edge view of the stop disc.

FIG. 2 is an exploded perspective view of the clock shown in FIG. 1, certain parts being omitted for clarity and the relative positions of the parts being distorted for ease of illustration.

FIG. 2–A is a detail of the armature locking portion thereof.

FIG. 3 is an enlarged partial view in elevation of certain details of the clock, illustrating cams and cam-follower and armature locking means, this figure showing the clock mechanism in normal condition where no reset is called for.

Figure 1:
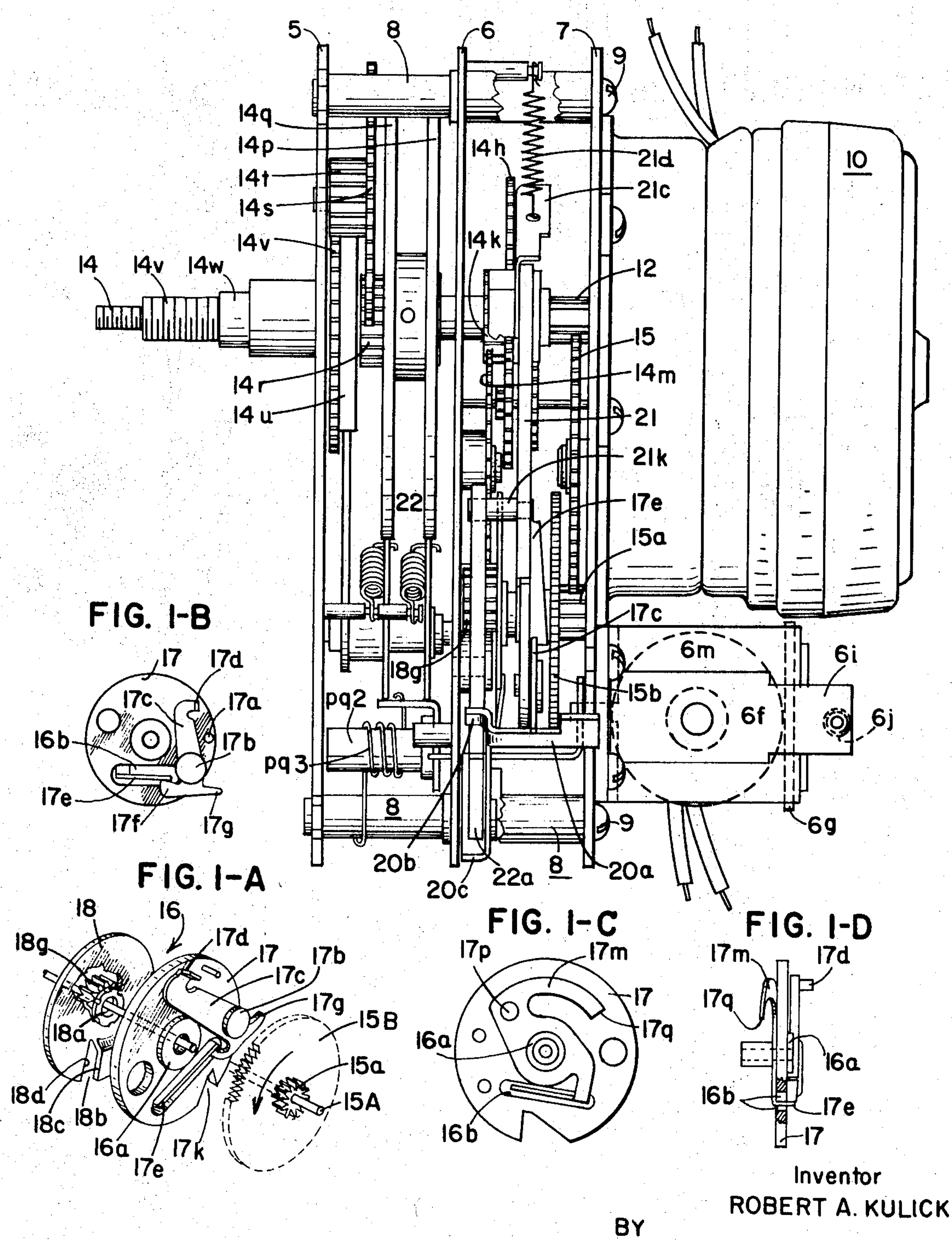
Figures 2, 2A:
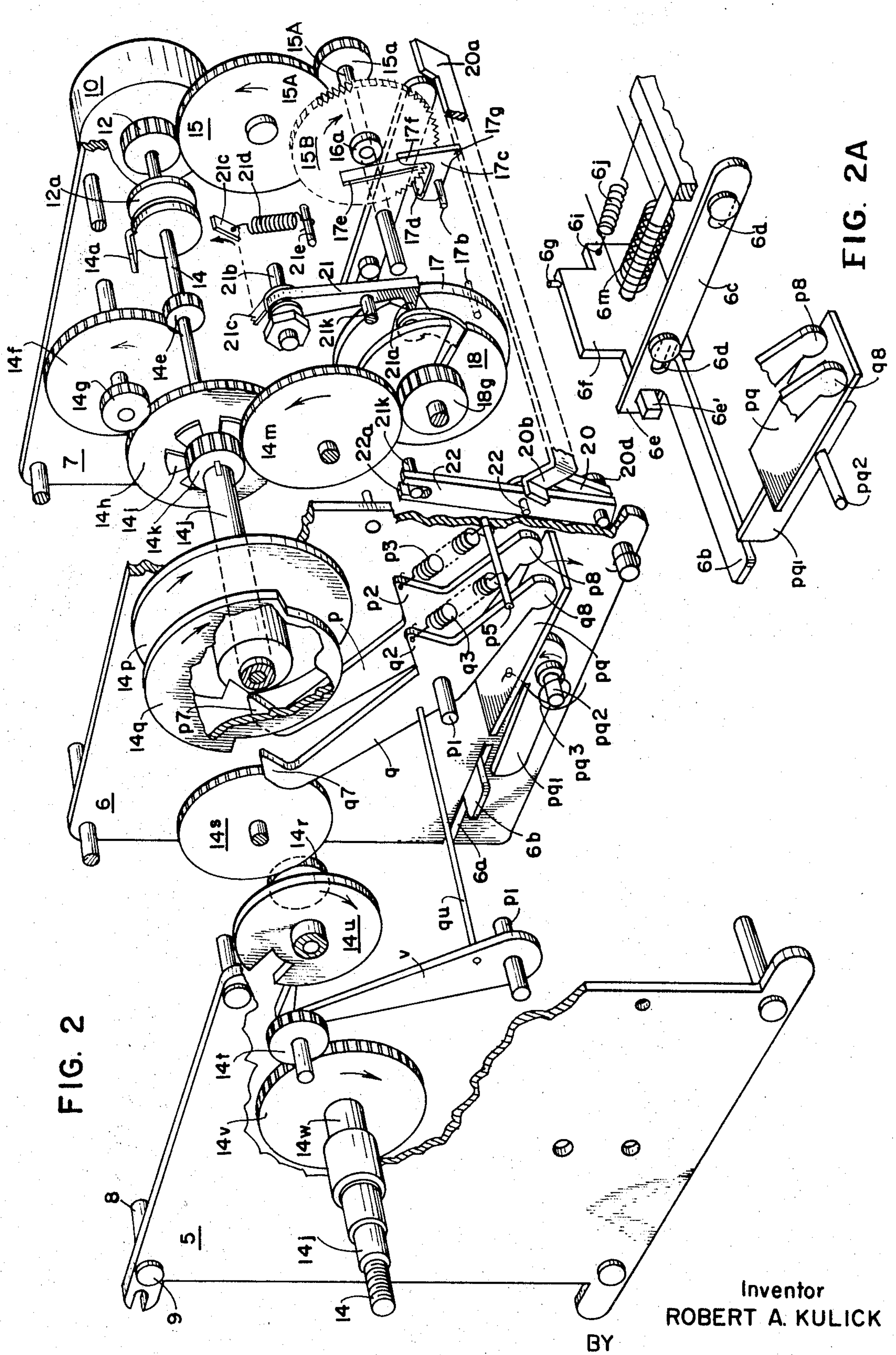
Figure 3:
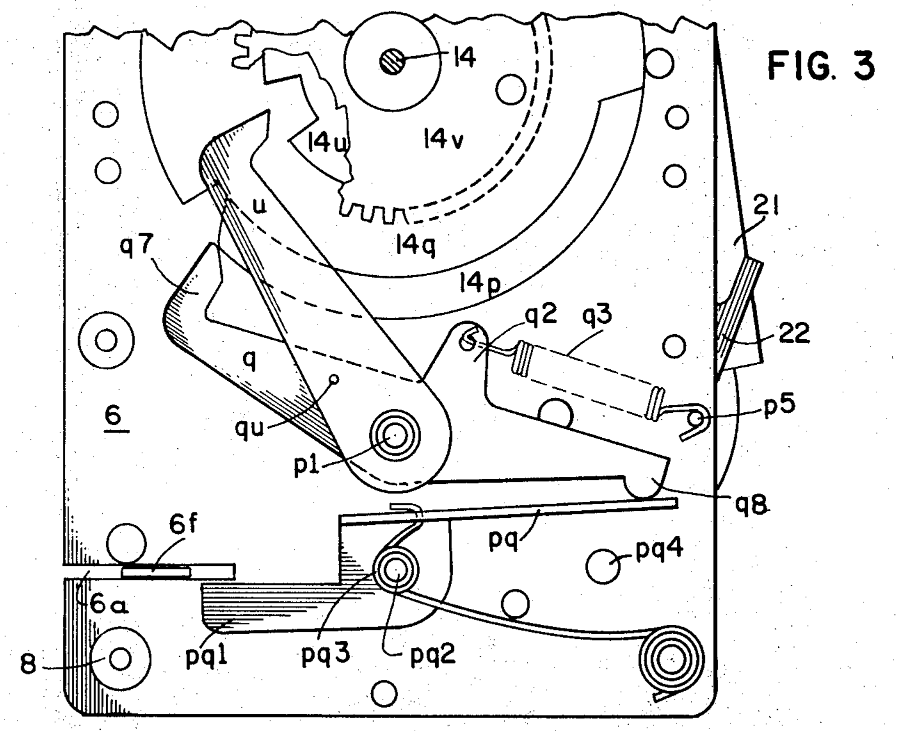
Figures 4, 4A:
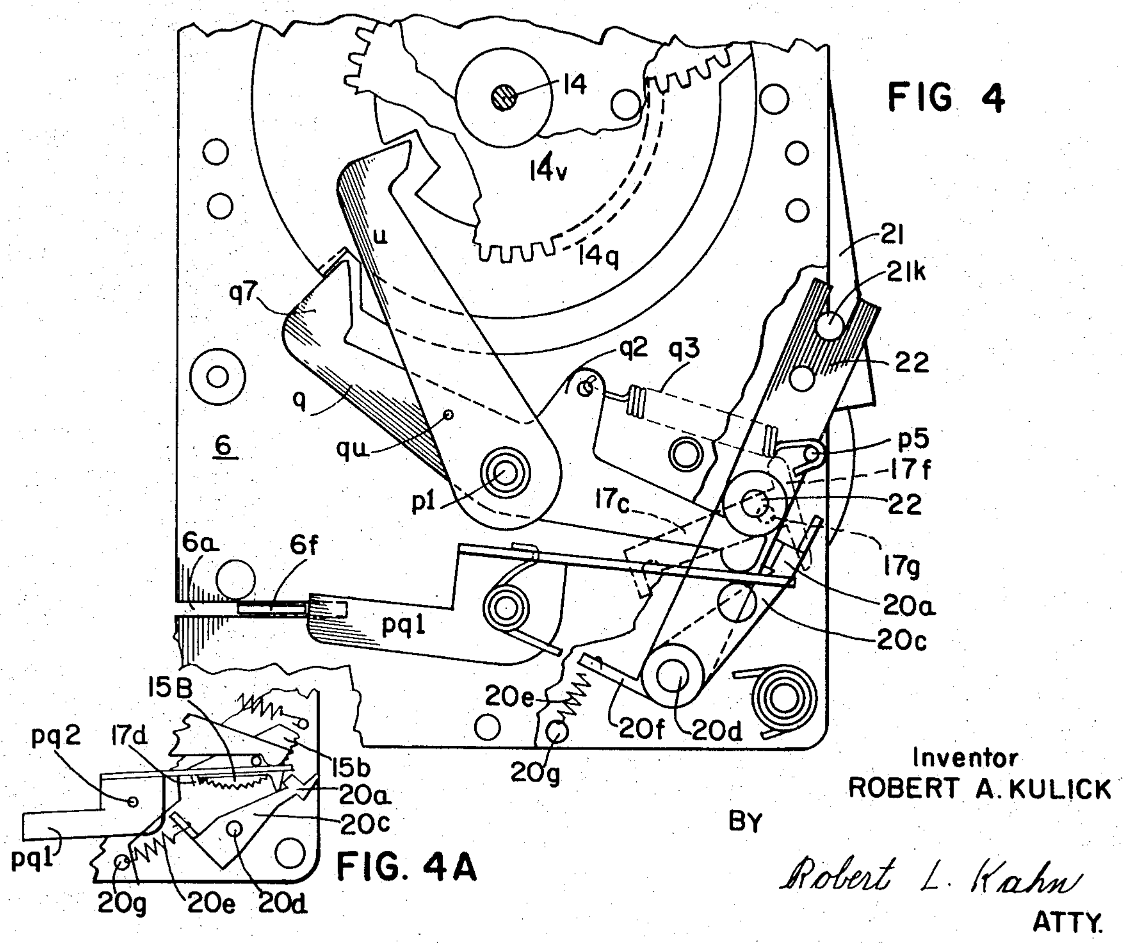
FIG. 4 is a view generally similar to FIG. 3 showing reset blocking position of parts and also showing parts broken away to illustrate clock reset action.

FIG. 4–A is a detail illustrating parts of the reset mechanism of the lower right hand portion of FIG. 4.

The clock parts are supported in a structure having front plate 5, middle plate 6 and rear plate 7 disposed in laterally offset parallel spaced planes. The plates are of steel, brass, or any other material strong enough to support the component parts in conventional fashion in the clock art. The three plates are maintained in fixed relative position by spacing sleeves 8 and screws 9. As is usual in the clock art, stamped gears having metal cutouts therefrom to reduce weight are carried on spindles.

Secured to the outer face of rear plate 7 is synchronous motor 10 driving pinion 12. Between the motor proper and pinion 12, there may be a gear-train for reducing the speed of the motor shaft so that pinion 12 will turn at 1 r.p.m. as an example. Rear plate 7 is apertured to permit pinion 12 to project into the space between middle plate 6 and rear plate 7. Pinion 12 is connected through friction coupling 12*a* to seconds arbor 14. Arbor 14 extends through front plate 5 and normally carries a seconds indicating hand, not shown, for conventional clock display. Inasmuch as friction couplings are well known in the clock art, no detailed showing is necessary.

Firmly secured to the coupling portion for seconds arbor 14 is stop arm 14*a*. Stop arm 14*a* will turn with seconds arbor 14 and, as will be explained later, is used to stop rotation of the seconds arbor. Further along on seconds arbor 14 in the direction of clock drive toward front plate 5 is pinion 14*e* which meshes with reducing gear 14*f* carried on a small spindle laterally offset from the axis of seconds arbor 14. Reducing gear 14*f* drives small gear 14*g* on the same spindle, and this small gear in turn drives minute drive gear 14*h*. Minute drive gear 14*h* is concentric with seconds arbor 14 and is coupled through friction clutch 14*i* to minute tube 14*j*, which extends through front plate 5. Secured to minute tube 14*j* is first minute drive pinion 14*k* which meshes with intermediate gear 14*m*. This intermediate gear 14*m* comes into play in connection with reset action of mechanism to be described later.

Returning to minute drive gear 14*h*, as noted earlier, this drives minute tube 14*j* carrying a pair of cams 14*p* and 14*q*. Cam 14*p* is a minute lockout cam while cam 14*q* is a "twelve hour" timer cam. Both of these cams are rigidly secured to minute tube 14*j*, and their cam shapes and functions will be described later. Also secured to 14*j* is an additional minute drive pinion 14*r*, which meshes with minute tube hour reduction gear 14*s*, which carries pinion 14*t* on the same spindle. Gears 14*s* and 14*t* are carried on a spindle offset from the axis of seconds arbor 14*a*. Gear 14*t* drives hour gear 14*v* secured to hour tube 14*w*.

Hour tube 14*w* has secured thereto "twelve hour" lockout cam 14*u*. With the exception of intermediate reset gear 14*m*, the various parts carrying numeral 14 and letters from 14*e* through to 14*w* are used in connection with conventional clock drive for time keeping purposes.

For reset, pinion 12 from motor 10 meshes with gear 15 to provide an alternate path for power flow to minute pinion 14*k*. Gear 15 meshes with gear 15*a*, secured to spindle 15A and also secured to ratchet gear 15B. Spindle 15A passes through sleeve 16*a* of a stop-disc assembly 16. Stop-disc assembly 16 has disc 17 carrying pick-up pawl 17*c*. Pivot 17*b* for pick-up pawl 17*c* is displaced from the center of disc 17. Disc 17 carries stop pin 17*a* near the edge thereof to limit the rocking of pick-up pawl 17*c*. Pick-up pawl 17*c* has at one end thereof claw 17*d* extending laterally from the face of disc 17 and is normally adapted to override the teeth of ratchet gear 15*b*. Pick-up pawl 17*c* is biased so that claw 17*d* normally tends to engage a tooth of ratchet gear 15B. This bias is provided by small spring 17*e* pressing against one tip 17*f* of pick-up pawl 17*c*. Spring 17*e* extends through slot 16*b* in disc 17, and forms a part of a spring metal secured to disc 17. Pickup pawl 17*c* also has detent finger 17*g* which extends beyond the edge of disc 17. Sleeve 16*a* extends through disc 17 beyond the other side of the disc from the side carrying pick-up pawl 17*c*. On this other side of disc 17 metal pick-up spring finger 17*m* is rigidly secured to disc 17 at 17*p*, and forms part of the S-shaped piece of spring metal secured to disc 17 at sleeve 16*a* carrying previously mentioned spring 17*e*. Spring finger 17*m* is shaped as an arcuate strip sprung laterally away from disc 17 toward disc 18 and terminating in sharp tip 17*q*.

Disc 18 has sleeve portion 18*a* which is adapted to slide over sleeve portion 16*a* of disc 17. Disc 18 is disposed against that face of disc 17 carrying arcuate spring finger 17*m*. Disc 18 has radial slot 18*b* extending from the edge of the disc having slot sidewalls 18*c* and 18*d*. As seen from front plate 5, ratchet gear 15B normally rotates in a clock-wise direction and when claw 17*d* engages a tooth of the ratchet gear during reset, stop-disc 17 will be driven in a clock-wise direction. It is understood that the ratchet teeth of 15B are shaped so that such engagement between the claw and teeth of the ratchet gear is possible. When reset is occurring, disc 18 is also driven in a clock-wise direction as viewed from front plate 5. Side wall 18*c* of disc slot 18*b* will be the leading side when disc 18 is driven from ratchet gear 15B. This leading side wall 18*c* is bent laterally toward disc 17 so that sharp end 17*q* will catch against laterally offset slot wall 18*c* after disc 17 has turned and spring finger 17*m* passes slot wall 18*d* and encounters slot 18*b*. Thus between disc 17 and disc 18 there is effectively provided a one way drive in appropriate direction for transmitting reset power from ratchet gear 15B to disc 18. Between disc 15B and disc 17 there is provided what in effect is a fast acting clutch.

Sleeve 18*a*, secured to disc 18 carries reset pinion 18*g* which meshes with intermediate reset gear 14*m*. As heretofore described, intermediate gear 14*m* meshes with minute gear 14*k* and thus, when reset is occurring, functions to turn reset gear 14*k* and minute tube 14*j* at an accelerated rate in a clock-wise direction for reset action. As will be shown later, a complete operating reset cycle is initiated when claw 17*d* engages a tooth of ratchet gear 15B and causes rotation of disc 17 from a predetermined starting position through a complete turn to the stopping position, which becomes the starting position for a succeeding reset cycle. Gear ratios for reset are such that during a reset cycle (which is initiated only by a signal pulse) reset advances the entire clock mechanism by almost an hour (as for example 58 minutes) depending on the operating characteristics of the clock system.

Referring to cams 14*p* and 14*q*, each such cam has its own individual follower *p* and *q*. These two followers are essentially similar and are rockable about stationary pivot pin *p*1. Follower *p* has lateral extension *p*2 to which is attached one end of coil spring *p*3 the other end of which is anchored to fixed pin *p*5. The arrangement is such that coil spring *p*3 will bias follower *p* so that cam follower tip *p*7 presses against the edge of cam 14*p*. The outer edge of cam 14*p* functions as a cam surface and is provided with a drop subtending a prescribed angle corresponding to several minutes of clock time in accordance with the rotation of minute tube 14*j*. The shape of the cam drop is such that follower *p* drops suddenly at the leading edge of the cam drop and can rise slowly at the trailing end. This particular action of follower *p* in cooperation with cam 14*p* is more fully described in my aforementioned patent application.

Follower *p* has its free end *p*8 rounded to bear against plate *pq*, forming part of lockout lever *pq*1 pivotted for rocking about pin *pq*2. When pointed tip *p*7 goes into the drop of cam 14*p*, due to the pull of bias spring *p*3, follower *p* will rock clockwise, as seen from front plate 5, and will rock lockout lever *pq*1 clockwise until *pq* rests against stop pin *pq*4 carried by plate 6. Lockout lever *pq*1 is long enough so that it can cover part of slot 6*a* in the edge of middle plate 6 when rocked. Normally lockout lever *pq*1 is weakly biased by spring *pq*3 to be below slot 6*a*. In such a condition, follower *p* is in its normal counterclockwise position with tip *p*8 in its up position. Spring *p*3 is much stronger than spring *pq*3.

Cam follower *q* is similar in all respects to follower *p* with corresponding parts carrying corresponding numbers. Cam 14*q* has a cam drop which is much greater in angular extent than cam *p*. Both cams have aligned leading sharp drops. However cam 14*q* has its drop great enough so that its follower can remain down for about twenty minutes, as an example, in the signal pattern used at the master clock, as more fully described in my earlier application.

Hour cam 14*u* has its follower *u* rockable about pin *p*1 and is tied by pin *qu* to follower *q* to rock together. Cam 14*q* functions as a supplement to cam 14*u* to provide accuracy at the ends of the cam drop for hour cam 14*u*.

The arrangement is such that lockout lever *pq*1 will be rocked to cover slot 6*a* when any one or more of cam followers *p*, *q* and *u* are in a cam drop. Otherwise lockout lever *pq*1 will be biased by its spring *pq*3 so that slot 6*a* is not covered.

Disposed in slot 6*a* is the end part of arm 6*b* extending laterally through plate 6 toward rear plate 7 and forming part of actuator trip slide 6*c*. Slide 6*c* lies against the inner surface of rear plate 7 and extends toward the edge of rear plate 7 adjacent to stop disc assembly 16 previously described. Actuator trip slide 6*c* is maintained in position against the inner face of rear plate 7 by rivets carrying enlarged heads, the rivets being in long slots 6*d* for permitting slide 6*c* to move longitudinally over a limited distance. Actuator trip slide 6*c* has its end 6*e* apertured to accommodate finger 6*e'* extending from armature 6*f*.

Armature 6*f* has pivot points 6*g* for mounting on a ferro-magnetic bracket secured to rear plate 7. Armature 6*f* has extension 6*i* to which bias spring 6*j* has one end attached, the other spring end being attached to the bracket. Thus armature 6*f* is normally biased away from the free core end of the electromagnet. When winding 6*m* is energized from the master clock, armature 6*f* is attracted and associated arm 6*b* tends to move deeper into slot 6*a*.

If armature 6*b* is free to move deeper into slot 6*a*, actuator trip slide 6*c* is moved longitudinally toward the right as viewed from front plate 5. If lockout lever *pq*1 covers part of slot 6*a*, then armature response to winding energization is prevented.

The mechanism so far described can function to block armature response when no reset is called for. When reset is called, the armature is free to respond to the energization of the electromagnet (due to the fact that the clock is off-time) the following additional mechanism is provided and will come into play. Actuator trip slide 6*c* has its free end rounded and normally rests near pick-up pawl throwout lever 20, which extends generally perpendicular to the planes of the clock plates and for most of the distance between middle plate 6 and rear plate 7. Pick-up pawl throwout lever 20 is irregularly shaped and has body portion 20*a* and bent end portion 20*b* with downwardly extending support portion 20*c* pivotally carried by pin 20*d* on plate 6. Pick-up pawl throwout lever 20 is normally biased to an idle position by spring 20*e* extending between tail piece 20*f* and stationary anchor pin 20*g* secured to middle plate 6. Body portion 20*a* normally functions as a detent against tip 17*g* of pick-up pawl 17*c* to keep claw 17*d* clear of the teeth of ratchet gear 15B. When actuator trip slide 6*c* is moved longitudinally for reset, pick-up pawl throwout lever 20 is rocked slightly in a clock-wise direction sufficiently to clear tip 17*g* of the pick-up pawl and permit engagement to take place between ratchet gear 15B and stop disc 17 as previously explained.

Stop disc 17 is provided with peripheral notch 17*k* into which tip 21*a* of aligner lever 21 normally rests. Lever 21 is pivotally secured at pin 21*b* carried by plates 6 and 7. Lever 21 has extension arm 21_c_ whose free end is normally outside the orbit of second stop finger 14_a_. Lever 21 and its extension arm 21_c_ is biased by spring 21_d_ extending between arm portion 21_c_ and pin 21_e_ carried by plate 6. Lever 21 is biased so that tip 21_a_ will be pressed against the edge of stop-disc 17. During reset when stop-disc 17 begins to turn in a clock-wise direction, as seen from the front of the clock, tip 21_a_ of lever 21 will be forced out of notch 17_k_ in disc 17 and will rock lever 21 and its extension arm 21_c_ so that the extension arm is moved into the orbit of seconds stop finger 14_a_. Extension arm 21_c_ will stop clock-wise rotation of that portion of the clutch on seconds arbor 14 and stop clock drive through the seconds arbor. It should be noted however that motor pinion 12 is still turning and will drive gear 15 for reset.

Once reset action is initiated, reset goes through one cycle which causes stop-disc 17 to make a complete revolution. Reset will be terminated when disc 17 has positioned notch 17_k_ allowing tip 21_a_ to drop. It is understood that if the duration of a reset signal is longer than reset then a second reset cycle may be initiated. However, in practice, the various gear ratios are so arranged that a complete reset cycle will take one minute, whereas a signal will run no more than 57 seconds and will not be repeated until after an entire minute has passed from the end of a reset cycle.

Aligner lever 21 carries pin 21_k_ which extends laterally toward middle plate 6 and is caught in slot 22_a_ of throwout lever 22. This throwout lever is pivoted at pin 22_b_ an has its edge so positioned as to permit an end of side portion 20_b_ of the pick-up pawl throwout lever 20 to rest against the same. The relationship between throwout lever 22 and pick-up pawl throwout lever 20 is such that once stop-disc 17 has started to turn during reset, throwout lever 22 will keep body portion 20_a_ clear of throwout pawl 17_c_ and prevent any possibility of claw 17_d_ from disengaging from the tooth of ratchet gear 15B during a reset cycle.

The arrangement of the various members is such that when the armature does move in response to a call for reset, seconds arbor 14 is stopped in a predetermined position (such as twelve o'clock), reset begins and minute tube 14_j_ is turned clockwise until the predetermined minute position is reached. At the end of a reset cycle, the seconds arbor and minute tube can both start from the predetermined position. If the clock is off for several hours, reset will be called for by successive signal pulses until the clock is fully reset. A complete reset action is fully described in my previously identified earlier patent application.

The general construction of means for providing reset including a ratchet gear which is continuously driven from the electric motor drive in the clock and having a pick-up pawl which is normally free of the teeth of the ratchet gear and having a pawl throwout lever for permitting said pawl to engage a tooth of the ratchet gear is old and well known; similarly a stop disc assembly carrying the pick-up pawl and having a one way drive for connecting the pick-up gear through the stop-disc assembly to a gear for driving a minute gear for reset and controlled by a one revolution clutch, together with means for stopping rotation of the seconds arbor are also old as for example in U.S. Pat. No. 2,569,815 issued Oct. 2, 1951 to Larrabee.

The operation of the clock, both during reset and when reset is blocked, has been fully set forth.

What is claimed is:

1. A remote clock comprising a plurality of laterally offset spaced parallel plates, means for maintaining said plates in fixed positions; a seconds arbor, a minute tube about said arbor, an hour tube about said minute tube, means for supporting said arbor and tubes in said plates for rotation; a synchronous motor drive pinion, means including a friction clutch for connecting said motor drive pinion to said seconds arbor to drive the same; a gear train connecting said seconds arbor and a minute drive gear, a friction clutch between said minute drive gear and the minute tube, at least one minute cam coupled to said minute tube to rotate in fixed relation thereto; a gear train between said minute tube and hour tube, an hour cam coupled to said hour tube to rotate in fixed relation thereto; a clock reset power drive including a gear train between said motor drive pinion and minute tube for driving said minute tube at an accelerated rate for reset, said reset power drive including a ratchet gear and a stop disc coaxial with said ratchet gear but independently rotatable and normally stationary; a pick-up pawl carried by said stop disc and rockable about an axis parallel to and laterally offset from the stop disc axis, said pick-up pawl having a claw portion overriding the ratchet gear teeth and rockable to engage or clear ratchet teeth; spring means biasing said pawl into ratchet gear tooth engaging position, a pawl throw-out lever engageable with said pawl for retaining said pawl in an idle position; a one way drive between said stop disc and minute tube in a direction for reset; a stop finger on said seconds arbor; a follower for each cam, each cam having a portion thereof shaped to move its follower from a clock reset calling position to a reset blocking position; electromagnetic means including a winding and movable armature, said winding being adapted to receive reset signal pulses from a master clock at predetermined times; means for biasing said armature to a normally inactive position from which position winding energization tends to move said armature to a clock reset calling position; detent means disposed between said cam followers and armature for preventing armature movement from its normally inactive position when the clock is on time with both minute and hour cams oriented so that their followers are in reset blocking position; actuating means disposed between said armature and pawl throwout lever and responsive to armature movement for releasing said pick-up pawl to respond to its bias and establish a driving connection between the ratchet gear and said stop disc and initiate a minute gear reset cycle; a rockable lever having one end as a cam follower for cooperation with said stop disc and having its other end as a detent finger, said rockable lever normally being in a stand-by position when no reset action is occurring and with its detent finger inactive; said stop disc, upon rotation at reset initiation, rocking said rockable lever to move the detent finger into the orbit of said seconds arbor stop finger to stop rotation of said seconds arbor; said stop disc, at the end of its revolution, moving said rockable lever to its normal stand-by position and said pawl throwout lever engaging said pawl to maintain the pawl in an idle position; said reset cycle being reinitiated by a succeeding reset signal pulse so long as reset is called for.

2. The construction according to claim 1 wherein an additional minute cam is provided, the two minute cams being in aligned relation, one minute cam having a cam drop whose angular extent is sufficient to accommodate one reset cycle in response to a reset signal, said other minute cam having a cam drop whose angular extent is substantially greater than that of the first cam and can accommodate a number of successive reset cycles each of which is initiated in response to a reset signal, said two cams having their leading edges aligned and shaped to provide a quick drop for each cam follower and a generally gradual rise for the trailing end of each cam drop, said hour cam also having a drop whose angular extent is great enough to accommodate the longest reset calling drop of said other cam on the minute arbor, said hour cam having its leading cam drop edge aligned with the two minute cams, said other minute cam supplementing the action of said hour cam for precision control, means for tieing the follower for the other minute cam and the follower for the hour cam to rise or drop simultaneously, all of said cam drops corresponding in time, when a clock is running on time, to periods for reset signal reception, said reset blocking action occurring normally when a cam follower is at a cam drop with the clock running on time.

3. A construction according to claim 1 wherein said detent means includes a lock-out lever rockable about a pivot point, means coupling each of said cam followers to one portion of said lock-out lever, an armature actuated member movable in a slot in a plate of said clock, said lock-out lever being movable from a position where it clears a portion of said slot to a reset blocking position where it covers a portion of said slot, means for supporting said armature actuated member and said lockout lever so that when the latter covers part of said slot, it prevents movement of said member and thus prevents armature response to signal energization of the winding.

References Cited

UNITED STATES PATENTS 3,148,499 9/1964 Tringali -------------- 58—34

RICHARD B. WILKINSON, Primary Examiner

E. C. SIMMONS, Assistant Examiner

U.S. Cl. X.R.

58—26

UNITED STATES PATENT OFFICE
CERTIFICATE OF CORRECTION

Patent No. 3,563,025 Dated February 16, 1971

Inventor(s) Robert A. Kulick

It is certified that error appears in the above-identified patent and that said Letters Patent are hereby corrected as shown below:

Column 1, line 35, after "1968" insert -- now United States Patent No. 3,498,049 granted March 3, 1970. --; line 38, "application" should read -- patent --. Column 4, line 11, "application" should read -- patent --. Column 5, line 50, "application" should read -- patent --. Column 6, line 59, after "cycle" insert -- lockout --.

Signed and sealed this 7th day of December 1971.

(SEAL)
Attest:

EDWARD M.FLETCHER,JR.
Attesting Officer

ROBERT GOTTSCHALK
Acting Commissioner of Pa